(12) United States Patent
Thomas et al.

(10) Patent No.: US 6,909,999 B2
(45) Date of Patent: Jun. 21, 2005

(54) SOUND LINK TRANSLATION

(75) Inventors: Andrew Thomas, Atherton, CA (US); Stephen John Hinde, Bristol (GB); Martin Sadler, Bristol (GB); Simon Edwin Crouch, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 10/005,377

(22) Filed: Dec. 4, 2001

(65) Prior Publication Data

US 2002/0107942 A1 Aug. 8, 2002

(30) Foreign Application Priority Data

Dec. 7, 2000 (GB) .............................................. 0029800

(51) Int. Cl.[7] .................................................. G06F 17/50
(52) U.S. Cl. ................................................. 703/1; 707/6
(58) Field of Search ............................. 703/1; 707/5, 6, 707/10, 14; 709/218

(56) References Cited

U.S. PATENT DOCUMENTS

| 5,613,056 | A | * | 3/1997 | Gasper et al. ............... 345/473 |
| 5,761,280 | A | | 6/1998 | Noonen et al. ............ 379/93.27 |
| 5,945,989 | A | | 8/1999 | Freishtat et al. ............. 345/329 |
| 5,953,392 | A | | 9/1999 | Rhie et al. ................ 379/88.13 |
| 6,061,793 | A | | 5/2000 | Tewfik et al. ................ 713/176 |
| 6,163,803 | A | | 12/2000 | Watanabe ................... 709/217 |
| 6,243,443 | B1 | | 6/2001 | Low et al. ................ 379/88.17 |
| 6,607,136 | B1 | * | 8/2003 | Atsmon et al. .............. 235/492 |
| 6,721,741 | B1 | * | 4/2004 | Eyal et al. ..................... 707/10 |
| 6,760,697 | B1 | * | 7/2004 | Neumeyer et al. .......... 704/201 |
| 2002/0107596 | A1 | | 8/2002 | Thomas et al. ............... 700/94 |
| 2002/0107693 | A1 | | 8/2002 | Thomas .................... 704/270.1 |

FOREIGN PATENT DOCUMENTS

| EP | 0 847 179 A2 | 6/1998 |
| EP | 1 047 004 A2 | 10/2000 |
| JP | 11-110319 | 4/1999 |
| JP | 11-119974 | 4/1999 |
| KR | 2000-0017854 | 4/2000 |
| WO | 97/26733 | 7/1997 |
| WO | 00/22772 | 4/2000 |
| WO | 00/50984 | 8/2000 |
| WO | 01/86451 A1 | 11/2001 |

OTHER PUBLICATIONS

Abstract of Japanese Patent No. 11–119974, published Apr. 30, 1999, 1 page.

* cited by examiner

Primary Examiner—Albert W. Paladini

(57) ABSTRACT

A browser with a sound input receives a sound passage associated with a content site. The browser sends a representation of the sound passage to a service system where it is compared with stored representations of sound passages that each have an associated URI. On finding a match, the service system sends back the URI associated with the matched stored sound-passage representation. The browser uses this URI to access the content site.

17 Claims, 2 Drawing Sheets

SOUND LINK TRANSLATION

FIELD OF THE INVENTION

The present invention relates to the accessing of a content site using a sound hyperlink.

BACKGROUND OF THE INVENTION

In recent years there has been an explosion in the number of services available over the World Wide Web on the public internet (generally referred to as the "web"), the web being composed of a myriad of pages linked together by hyperlinks and delivered by servers on request using the HTTP protocol. Each page comprises content marked up with tags to enable the receiving application (typically a GUI browser) to render the page content in the manner intended by the page author; the markup language used for standard web pages is HTML (HyperText Markup Language).

However, today far more people have access to a telephone than have access to a computer with an Internet connection. Sales of cellphones are outstripping PC sales so that many people have already or soon will have a phone within reach where ever they go. As a result, there is increasing interest in being able to access web-based services from phones. 'Voice Browsers' offer the promise of allowing everyone to access web-based services from any phone, making it practical to access the Web any time and any where, whether at home, on the move, or at work.

Indeed, because many items around the home and office have a sound capability, it is attractive to use sound, not only for passing information to/from/between humans, but also for passing functional information such as URLS, to and between items of equipment. JP 11-119974 (Sony) describes various ways of using sound URLs, these being DTMF sound sequences that decode to character URLs.

A disadvantage of audible sound URLs is that they are generally highly unattractive to humans as they posses a fairly random structure of sound (or so it appears to the human ear). Whilst it is possible to hide sound data such as URLs in other, pleasanter sounds using sound watermarking techniques, this generally requires complex embedding and retrieval systems which is expensive.

It is an object of the present invention to provide improved sound URLs and methods for their usage.

SUMMARY OF THE INVENTION

According to one aspect of the present invention, there is provided a method of accessing a content site comprising the steps of:

(a) receiving a sound passage at a first system, the sound passage being associated with a content site;

(b) sending the sound passage, or a representation of it, from the first system to a service system;

(c) at the service system, comparing a representation of the sound passage sent from the first system with stored representations of sound passages that each have an associated URI; the service system on finding a match, sending back to the first system the URI associated with the matched stored sound-passage representation; and (d) at the first system, receiving the URI sent by the service system and using it to access the content site.

According to another aspect of the present invention, there is provided a service system for translating sound passages to URIs, the apparatus comprising:

means for receiving a representation of a sound passage from a client entity;

a database subsystem holding stored representations of sound passages that each have an associated URL, comparison means for comparing the received sound-passage representation with the stored sound-passage representations and, on finding a match, retrieving the URI associated with the matched stored representation; and means for returning the retrieved URI to the client entity.

BRIEF DESCRIPTION OF THE DRAWINGS

A method and arrangement embodying the invention will now be described, by way of non-limiting example, with reference to the accompanying diagrammatic drawings, in which.

BEST MODE OF CARRYING OUT THE INVENTION

Figure 1:
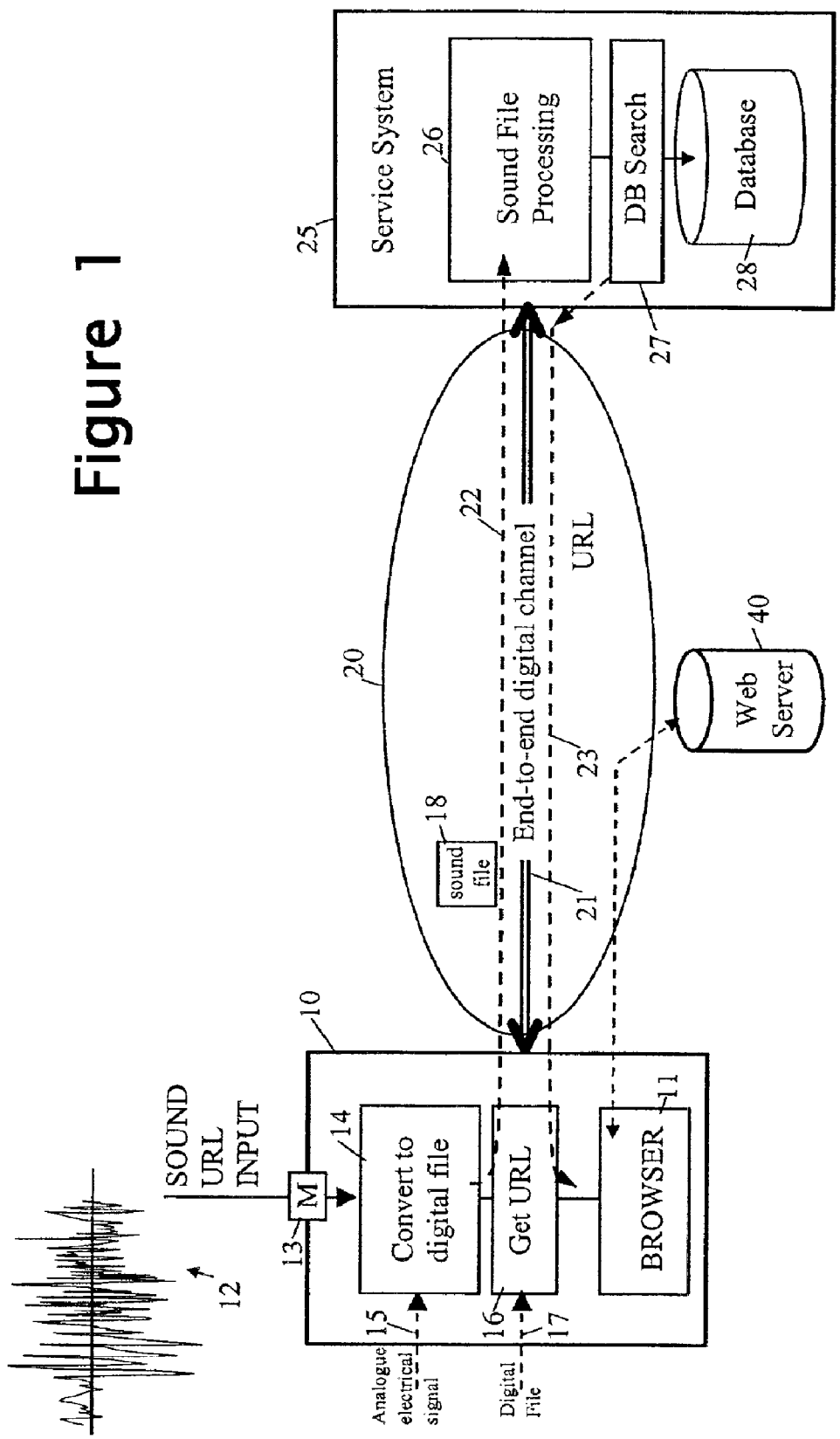
FIG. 1 is a diagram showing the use of a service system to map between sound passages and URLs.

FIG. 1 shows an arrangement which enables pleasant sound passages, and in particular musical passages and extracts, to be used to pass URLs.

More particularly, end-user equipment 10 has a web browser 11 which can be used to contact web sites over the internet 20. Equipment 10 is provided with a sound input microphone 13 for receiving sound passages 12 which can be used to obtain website URLs. The sound passage signals from microphone 13 are passed to converter 14, which converts the input signal into a digitised audio file of standard format (such as WAV or MP3). The converter 14 can also receive a direct analogue electrical signal input 15 from an external source.

The converter 14 passes the sound-passage audio file to unit 16 which is responsible for contacting service system 25 and passing it a copy of the audio file 18 (see arrow 22) in order to have the latter return a corresponding URL. Unit 16 contacts the service system over an end-to-end digital channel 21 through communications infrastructure 20 (typically, the public internet accessed via an appropriate access network).

Unit 16 can also be arranged to receive digitised audio files directly from an external source 17 and pass them to the service system for mapping to URLs.

The service system holds a database 28 of sound passage representations. These representations will typically be in the form of characteristic features of the corresponding passages rather than exact reproductions of the sound passages. For example, the characteristic note sequences of the main tune or tunes of a sound passage can be stored as its characterising feature set. Associated with each stored sound-passage representation is the URL of a website that has registered to use the sound passage as an audio link signature.

A sound file processing block 26 at service system 25 processes the received audio file 18 to effect feature extraction in the same manner as used to extract the features used to characterise the sound passages whose representations are stored in database 28. The extracted features of the received audio file are then used by DB search block 27 to effect a comparison search with the contents of the database. Upon a match being found, the URL associated with the matching stored sound-passage representation is returned by block 27 to the unit 16 (see arrow 23). Unit 23 then passes the URL to browser 11 which uses it to contact the website concerned—in this case, website 40.

It should be noted that the sound file processing block does not work on the basis of mapping sound features to characters of the URL but instead seeks to identify the sound passage used to represent a URL and then maps that identity to the URL. As a result, any sound passage can be used to represent any URL.

Figure 2:
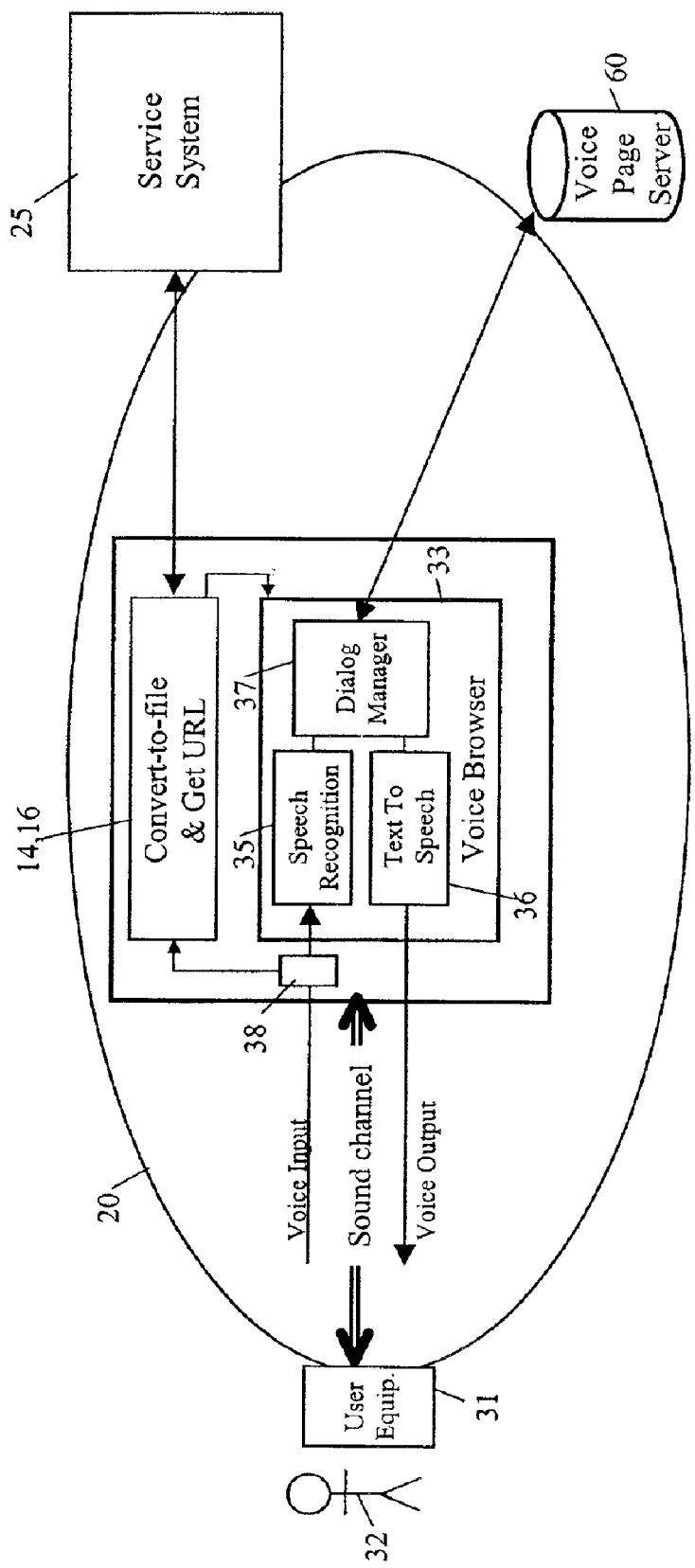
FIG. 2 is a diagram showing the use of the FIG. 1 service system by a network voice browser.

FIG. 2 shows a variation of the FIG. 1 arrangement in which the functionality of equipment 10 is incorporated into a voice browser 33 located in the communications infrastructure (for example, provided by a PSTN or PLMN operator or by an ISP). A voice browser allows people to access the Web using speech and is interposed between a user 32 and a voice page server 60. This server 60 holds voice service pages (text pages) that are marked-up with tags of a voice-related markup language (or languages). When a page is requested by the user 32, it is interpreted at a top level (dialog level) by a dialog manager 37 of the voice browser 33 and output intended for the user is passed in text form to a Text-To-Speech (TTS) converter 36 which provides appropriate voice output to the user. User voice input is converted to text by speech recognition module 35 of the voice browser 33 and the dialog manager 37 determines what action is to be taken according to the received input and the directions in the original page. Whatever its precise form, the voice browser can be located at any point between the user and the voice page server; in the present case, it is shown as located in the communications infrastructure.

The sound channel between the user's equipment 31 (for example, a mobile phone) and the voice browser 33 permits a URL-representing sound passage to be passed to the browser. In order to indicate the nature of the sound passage, it is preceded by a "start" sound marker and followed by a "stop" sound marker; the start and stop markers are, for example, predetermined tone sequences. An intercept unit 38 at the voice browser uses these markers to strip out the sound passage from the normal input stream of the voice browser and pass it to functionality corresponding to units 14 and 16 in FIG. 1. This functionality uses service system 25 to look up the URL corresponding to the sound passage and pass it to the browser.

Many variants are, of course, possible to the arrangements described above. For example, a user can place a voice circuit call to the service system 25 and play, sing or otherwise present a sound passage to the service system over the voice circuit. In this case, the service system 25 includes functionality for converting the input thus received into a form suitable for processing by block 26. Upon a match being found, the service system can speak back the corresponding URL via a text-to-speech converter.

Furthermore, the search space for the comparison search effected by the service system can be reduced by forming a frequency/power spectrum for the received sound passage, the stored sound passage representations being classified into groups by frequency/power spectrum and the service system limiting its comparison search to the group of stored representations that have a frequency/power spectrum covering that of the received sound-passage representation.

The stored sound passage representations in database 28 can be representations over the full length of musical works, the sound passage received by the service system 25 being matched against these representations by successive comparisons along the lengths of the works where the duration of the received sound passage is less than that of the works represented by the stored representations. In this respect, where the database stores extracted feature sets as the representation of a work, it is convenient to provide multiple feature sets, each corresponding to respective part of the overall work.

Rather than directly storing URLs against sound passage representations, the database 28 can hold an intermediate site identifier such as a URN (Uniform resource Name) which it then uses to look up the URL of the site, possibly with the help of an external service; alternatively, the URN is returned to user-equipment 10 to enable the latter to look up the target website URL. In general terms, the service system uses a presented sound passage to look up and return the URI (Uniform Resource Identifier) of the corresponding site.

What is claimed is:

1. A method of accessing a content site comprising the steps of:
   (a) receiving a sound passage at a first system, the sound passage being associated with a content site;
   (b) sending the sound passage, or a representation of it, from the first system to a service system;
   (c) at the service system, comparing a representation of the sound passage sent from the first system with stored representations of sound passages that each have an associated URI; the service system on finding a match, sending back to the first system the URI associated with the matched stored sound-passage representation; and
   (d) at the first system, receiving the URI sent by the service system and using it to access the content site.

2. A method according to claim 1, wherein the sound passage is received in step (a) through a microphone and converted to an audio file format for sending to the service system in step (b).

3. A method according to claim 1, wherein the sound passage is received in step (a) as an analogue electrical signal and is converted to an audio file format for sending to the service system in step (b).

4. A method according to claim 1, wherein the sound passage is received in step (a) in digital form and is sent in an audio file format to the service system in step (b).

5. A method according to claim 1, wherein the search space for the comparison search effected in step (c) is reduced by forming a frequency/power spectrum for the received sound passage representation, the stored sound passage representations being classified into groups by frequency/power spectrum and the service system limiting its comparison search to the group of stored representations that have a frequency/power spectrum covering that of the received sound-passage representation.

6. A method according to claim 1, wherein the stored sound passage representations are representations of full length musical works, the sound passage received by the service system being matched against these representations by successive comparisons along the length of the works where the duration of the received sound passage is less than that of the works represented by the stored representations.

7. A method according to claim 1, wherein in step (c) the service system extracts features from the received sound passage with the extracted feature set then being used to carry out the comparison searching, said stored representations being similar feature sets of their corresponding sound passages.

8. A method according to claim 7, wherein the extracted features are the notes of a basic tune presented by the sound passage.

9. A method according to claim 1, wherein the said first system is a voice browser.

10. A method according to claim 1, wherein said URI is a URL.

11. A service system for translating sound passages to URIs, the apparatus comprising:
   means for receiving a representation of a sound passage from a client entity;
   a database subsystem holding stored representations of sound passages that each have an associated URL,
   comparison means for comparing the received sound-passage representation with the stored sound-passage representations and, on finding a match, retrieving the URI associated with the matched stored representation; and
   means for returning the retrieved URI to the client entity.

12. A service system according to claim 11, wherein the received sound-passage representation is an encoding of the sound passage in a standard audio file format.

13. A service system according to claim 11, wherein the stored sound-passage representations are classified into groups by frequency/power spectrum, the comparison means includes means for forming a frequency/power spectrum for the received sound-passage representation, and the comparison means being operative to limit its comparison search to the group of stored representations that have a frequency/power spectrum covering that of the received sound-passage representation.

14. A service system according to claim 11, wherein the stored sound-passage representations are representations of full length musical works, the comparison means being operative to match the received sound-passage representations against the stored representations by successive comparisons along the length of the works where the duration of the received sound passage is less than that of the works represented by the stored representations.

15. A service system according to claim 11, wherein each stored sound-passage representations take the form of a set of features extracted from the sound passage represented, the comparison means including means for extracting features from the sound passage represented by the received representation , and means for comparing the set of features so extracted with the features sets forming the stored representations.

16. A service system according to claim 15, wherein the extracted features are the notes of a basic tune presented by the sound passage.

17. A service system according to claim 11, wherein said URI is a URL.

* * * * *